July 8, 1969    W. B. BURKETT ET AL    3,454,860
VOLTAGE CUT-OFF CIRCUITS
Filed Feb. 25, 1966    Sheet 1 of 4
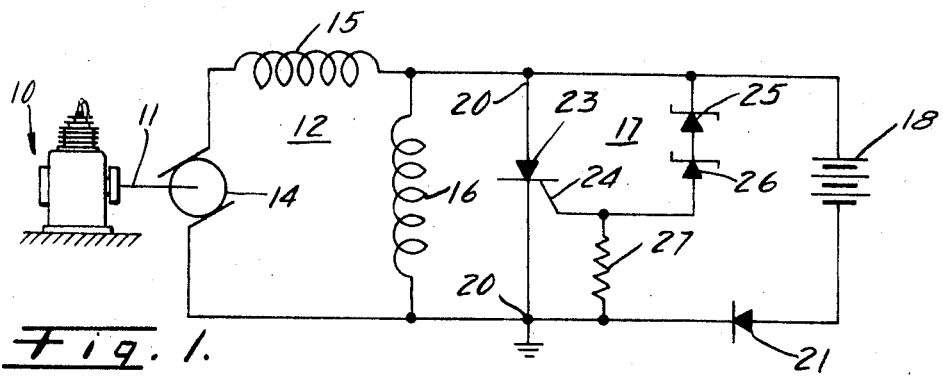
Fig. 1.
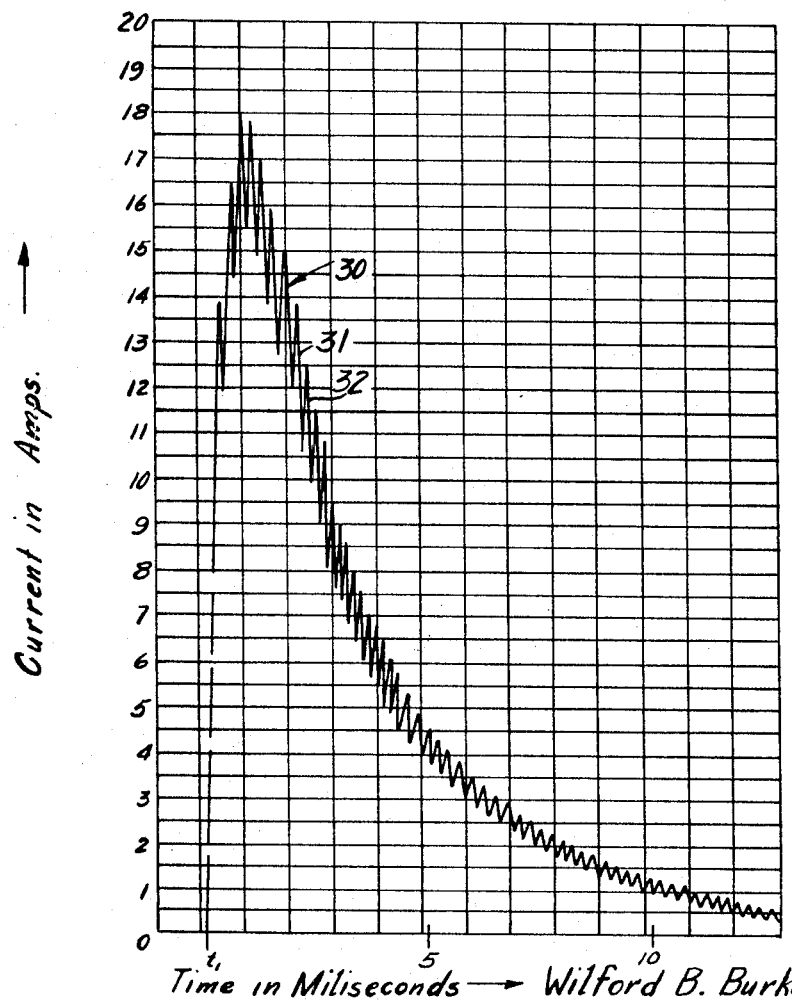
Fig. 2.
Wilford B. Burkett,
Robert V. Jackson, INVENTORS.
WHANN & McMANIGAL
BY Attorneys for Applicants
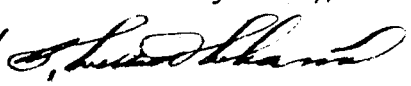

Wilford B. Burkett,
Robert V. Jackson,
INVENTORS.
WHANN & McMANIGAL
Attorneys for Applicants

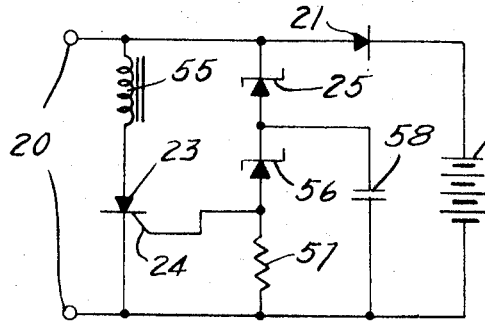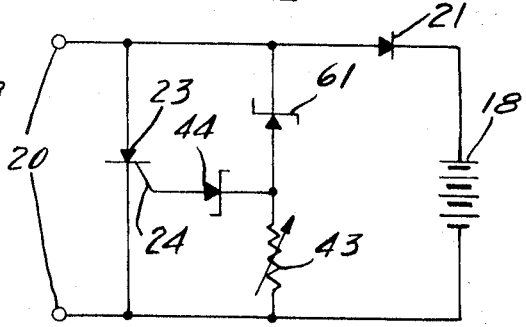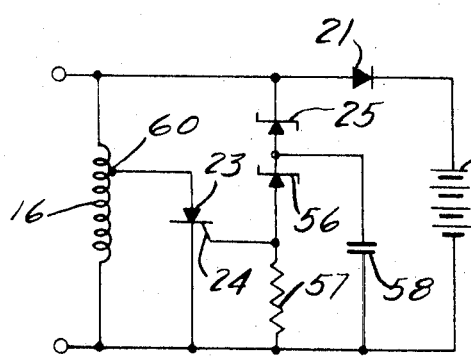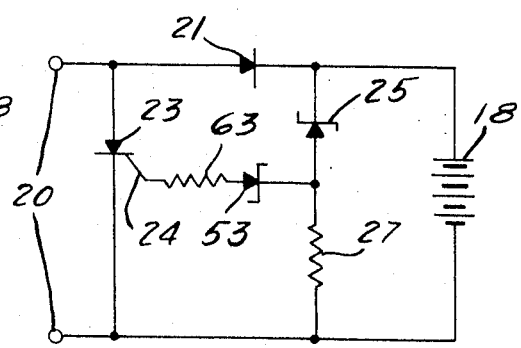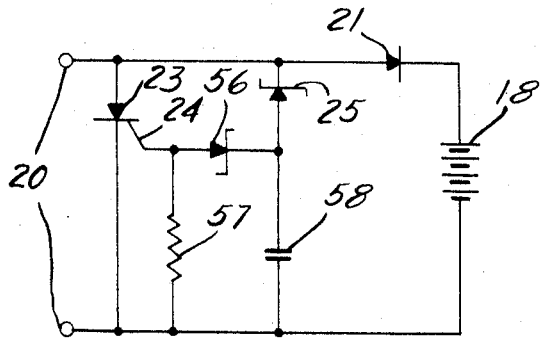

United States Patent Office 3,454,860
Patented July 8, 1969

3,454,860
VOLTAGE CUT-OFF CIRCUITS
Wilford B. Burkett, Pacific Palisades, and Robert V. Jackson, Los Angeles, Calif., assignors to McCulloch Corporation, Los Angeles, Calif., a corporation of Wisconsin
Filed Feb. 25, 1966, Ser. No. 530,129
Int. Cl. H02j 7/04, 7/16
U.S. Cl. 320—28                                12 Claims

ABSTRACT OF THE DISCLOSURE

Voltage cut-off circuits for cutting off the charging current to a battery from a variable direct-current generator having a shunt winding, the circuits include a voltage-responsive switch connected across the shunt winding of the generator for short-circuiting the shunt winding when the battery voltage reaches a predetermined level and a voltage level sensing circuit for controlling the operation of the switch.

This invention relates generally to voltage-responsive circuits, and particularly relates to an electronic circuit for cutting off the charging current between a variable, direct-current voltage source and a battery.

The voltage-responsive circuit of the present invention is particularly designed to cut off the charging current which charges a battery of secondary cells from a DC (direct-current) generator driven by an internal combustion engine with a widely varying speed. For example, the circuit of the present invention is particularly designed for use in connection with a chain saw driven by a single cylinder, two-cycle, internal combustion engine. An electric generator having series and shunt field windings may be mechanically coupled to the engine and may be utilized as the starter for the engine. The battery in turn consists of a plurality of secondary cells such as nickel-cadmium cells that are rechargeable. Thus, by driving the DC motor from the battery, the engine can be started. After the engine has been started, the battery must be recharged. To this end the generator may be directly driven by the engine to supply charging current to the battery.

However, the charging voltage must be closely controlled to avoid damage to the secondary batteries. To this end it may be assumed that the voltage across the battery is an indication of the state of charge of the battery.

It is, accordingly, an object of the present invention to provide an electronic circuit for cutting off the charging current between a variable voltage source and a battery consisting of secondary cells in response to a predetermined voltage across the battery, thereby to prevent damage to the battery.

Another object of the present invention is to provide an electronic circuit for short-circuiting the shunt winding of a DC generator utilized for charging a battery consisting of secondary cells in response to the voltage across the battery having reached a predetermined value, thereby to substantially reduce the output voltage of the generator.

A further object of the present invention is to provide an electronic circuit of the type referred to, which is so designed that it is substantially independent of temperature variations and which nevertheless can be manufactured at a competitive price.

In accordance with the present invention there is provided a voltage-responsive circuit for cutting off the charging current between a variable voltage source such as a DC generator and a battery. The generator is subject to being driven at widely varying speeds and includes a shunt field winding. A rectifier is connected in series with the battery, the rectifier being so poled as to permit charging of the battery when the voltage across the generator exceeds the battery voltage. There is further provided an electronic switch such, for example, as a silicon controlled rectifier which is connected across the shunt winding of the generator.

This switch is adapted to short-circuit the shunt winding when triggered. The triggering is effected by circuit means coupled to the switch and responsive to the voltage across the battery. Thus, the electronic circuit means may consist of a voltage divider which may, for example, include a Zener or breakdown diode. Preferably the electronic components, particularly the silicon controlled rectifier and the Zener diode, are so designed and arranged as to minimize variation in the voltage response due to changes of temperature which may be caused either by ambient temperature changes or by the operation of the generator and the internal combustion engine connected thereto.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings, in which:

FIG. 1 is a circuit diagram of a preferred electronic circuit embodying the present invention and including a DC generator;

FIG. 2 is a graph plotting the current as a function of time and showing the current through an electronic switch included in the circuit of FIG. 1;

FIGS. 5 through 14 are circuit diagrams of other embodiments of the voltage cut-off circuit of the present invention.

Figure 3:
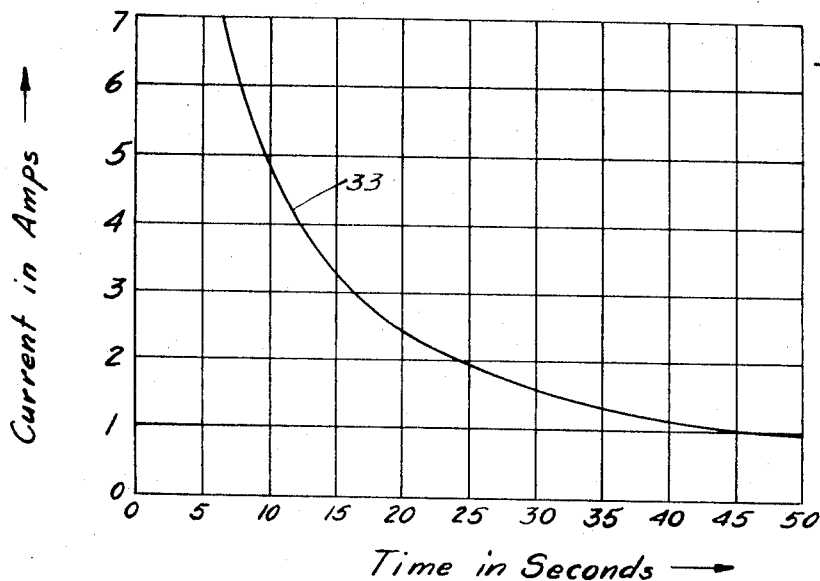
FIG. 3 is a graph showing the current as a function of time to show the allowable charging period of a secondary or rechargeable cell.

Referring now to the drawings, wherein like elements are designated by the same reference characters, and particularly to FIG. 1, there is illustrated an electronic circuit embodying the present invention. The circuit of FIG. 1 shows the presently preferred embodiment of the invention and includes a prime mover generally indicated at 10 such, for example, as an internal combustion engine. As previously pointed out, the electronic circuit of the present invention is particularly designed for use with a chain saw driven by a single cylinder, two-cycle, internal combustion engine. However, in general, it will be understood that the electronic circuit of the invention is particularly applicable for all types of internal combustion engines where the engine speed varies over a wide range. Examples of such engines are outboard boat engines, engines for automotive vehicles as well as other engines used for portable or transportable power tools and even for stationary applications.

The gasoline engine 10 is preferably directly connected such as by a drive shaft 11 to a DC generator generally indicated at 12. The DC generator has an armature 14 including the conventional armature windings, a series field winding 15 and a shunt field winding 16. It should be noted, as shown in FIG. 1, that the series winding 15 and the shunt winding 16 are connected in a closed loop with the armature 14.

It should be pointed out that the electronic circuit of the invention will operate with any DC generator as long as it has a shunt winding such as shown at 16. In other words, the generator may have no series field winding 15 but only a shunt field winding 16. On the other hand, the generator may have a shunt field winding 16 directly connected across the armature 14 and a series field winding connected in series with the load. In that case the generator may be compounded so that like magnetic poles of the series field winding 15 and the shunt field winding 16 are produced by the field windings. Hence, the two windings 15, 16 are connected in an aiding direction. On the other hand, the two windings may be connected in bucking relationship, that is, unlike magnetic poles may be produced by the field windings. Such a generator is generally referred to as a differentially compounded generator.

The electronic circuit 17 embodying the present invention is connected between the generator 12 and a battery 18 consisting of secondary cells. In other words, it is important that the battery consists of cells which are rechargeable such as nickel-cadmium secondary cells. Hence, the electronic circuit 17 is connected between the output terminals 20 of the generator, one of which may be grounded as shown, and the battery 18. Connected in series with the output terminals 20 and the battery 18 there is a rectifier or diode 21. As shown in FIG. 1, the diode 21 has its cathode connected to ground as shown. However, the rectifier 21 may also be connected between battery 18 and series field winding 15. The rectifier 21 is preferably a semiconductor diode but not necessarily so. It is so poled as to block current flow from the battery 18. Charging current to the battery occurs when the voltage of the generator 12 developed across the output terminals 20 exceeds a predetermined value. This is determined by the voltage across the battery 18 and the forward voltage drop across the diode 21.

Connected across the battery 18 and the diode 21 there is a multilayer diode 23 commonly known as a silicon controlled rectifier which may, for example, consist of an NPNP four-layer diode and operates as an electronic switch. This type of rectifier is provided with a gate or control electrode 24. The silicon controlled rectifier 23 is normally non-conductive. However, it does become conductive when a voltage of a given polarity and magnitude is applied across the device 23 and provided a voltage signal of predetermined magnitude is applied to its control electrode 24. In order to do this, there is provided a voltage divider circuit across the battery 18 and diode 21. This consists of two Zener diodes 25 and 26 connected in series and a resistor 27, their junction point being connected to the control electrode 24.

A Zener diode is also known as a breakdown diode and has such characteristics that it permits a current flow in a reverse direction through the diode only when the voltage across the diode exceeds a predetermined value. At that voltage the diode breaks down and begins to conduct. Obviously one of the Zener diodes such as diode 26 may be omitted.

The operation of the voltage cut-off circuit of the invention will now be explained. It is assumed the battery 18 is discharged from time to time. For example, its function may be to drive the generator 12 which then operates as an electric motor for starting the gasoline engine 10. To this end, of course, there must be a switch bypassing the diode 21. However, as far as the present invention is concerned all that is necessary is that the battery 18 has previously been discharged.

When the gasoline engine 10 driving the generator 12 reaches a certain speed, an output voltage is developed across the generator output terminals 20. Accordingly, when the output voltage developed at the generator output terminals 20 exceeds the forward voltage drop of diode 21 and the battery voltage, a charging current flows through the battery 18. As a general rule and as an approximation the battery voltage indicates the state of charge for any secondary cell battery. As a result the battery voltage increases as the percentage of the charge increases. Thus, the forward voltage drop of the diode 21 may, for example, be 0.6 volt. It may further be assumed that the battery 18 consists of 10 secondary cells each rated at 1.25 volts so that the nominal voltage across the battery 18 is 12.5 volts and may be as high as 15 volts.

Accordingly, assuming the flow of a charging current, the battery voltage increases and the generator output voltage also rises. This generator output voltage appears across the two Zener diodes 25, 26 and the resistor 27. The two Zener diodes 25, 26 are so selected that they conduct current in response to a predetermined voltage thereacross. Thus, when the voltage across the generator output terminals 20 reaches a certain value, the two Zener diodes 25, 26 will conduct and there will be a voltage drop across the resistor 27. This voltage drop appears at the control electrode 24. Assuming that this voltage is sufficiently high, it will trigger the silicon controlled rectifier 23 which subsequently becomes conductive.

This now short-circuits the shunt winding 16 and by-passes the field current of the generator. As a result, the generator loses excitation and the output voltage of the generator decreases to a small value. This small output voltage is sustained by the residual induction or remanence of the magnetic circuit of the generator.

Referring now to FIG. 2 there is illustrated a curve showing the current in amperes flowing through silicon-controlled rectifier 23 as a function of time in milliseconds. This curve shows that the current through the silicon-controlled rectifier 23 quickly reaches a peak value, then decays in a generally exponential fashion when the silicon-controlled rectifier becomes conductive.

It will be noted that the curve 30 consists of a multitude of individual falling curve portions such as 31 and rising curve portions such as 32. These are caused by the shape of the commutator of the generator and the speed of the generator. However, in any case, it is apparent that the charging current very rapidly decays within a matter of a few milliseconds.

Referring now to FIG. 3 there is illustrated a curve 33 showing the maximum permissible charging current in amperes as a function of time in seconds. Thus, any charging current for a nickel-cadmium cell below curve 33 is safe while any current above or to the right of curve 33 is unsafe. This curve clearly shows that such nickel-cadmium secondary cells will stand a very high charging current for a short period but can only accept a relatively low charging current for any extended period of time. In accordance with the present invention use is made of this curve because the battery is charged very rapidly with a large current but for a short period of time. As a result, the battery is again ready to be used, for example, for driving the generator 12 as a motor to start the gasoline engine 10.

Figure 4:
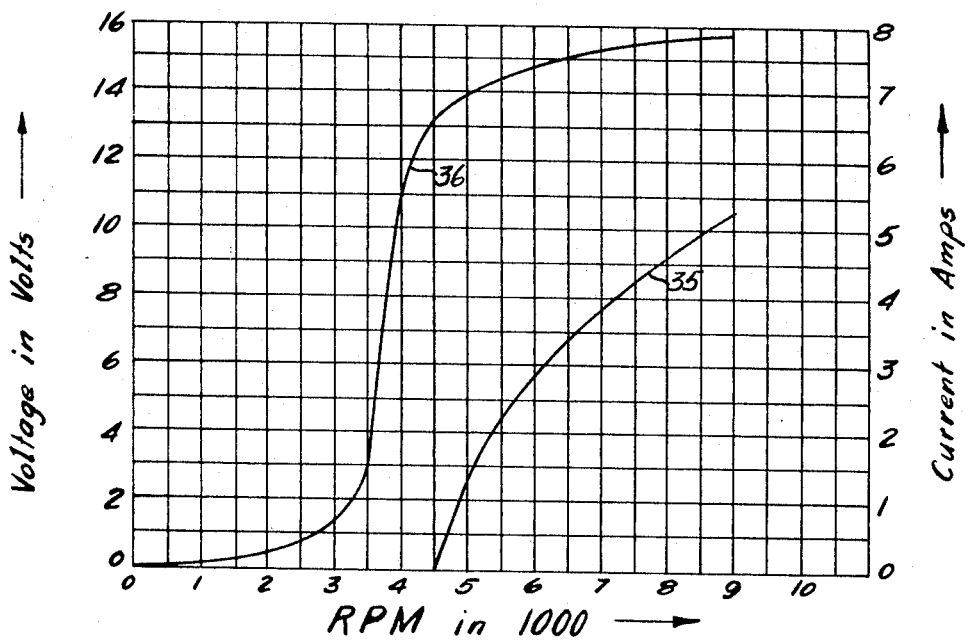
FIG. 4 is another graph showing the voltage as well as the current as a function of the number of revolutions of the engine driving the generator and indicating the characteristics of the generator output voltage and charging current.

FIG. 4 depicts both the generator output voltage across terminals 20 and the battery charging current as a function of the number of revolutions (r.p.m.) of the gasoline engine 10. Thus, the r.p.m. are shown in units of thousands in FIG. 4. The battery charging current is shown by curve 35 while curve 36 indicates the generator output voltage. It will be noted that the output voltage rises rapidly as the engine speed exceeds approximately 3,500 r.p.m. Below that value there is no charging current because the generator output voltage must exceed a certain value as pointed out before, such as about 13 volts before the charging current can flow through the diode 21.

It will thus be apparent that the cut-off circuit of the present invention operates in essence as a voltage limiter. It is triggered when the battery voltage exceeds a certain value and, hence, is sensitive to voltage. But it will not permit the generator output voltage to rise above a certain value which would ruin the battery.

As long as the generator is driven above a certain speed, say about 4000 to 5000 r.p.m., the residual magnetism in the yoke and in the field poles of the generator will be sufficient to maintain the silicon controlled rectifier 23 conductive. However, assuming that the prime mover 10 decreases its speed below some critical value; in that case there will not be enough voltage across the silicon controlled rectifier 23 for it to remain conductive. Accordingly, the controlled rectifier 23 now becomes nonconductive.

As the speed of the prime mover 10 increases again, the generator output voltage rises as shown by curve 36. Then, assuming that the battery had previously been charged sufficiently, the same sequence of events takes place again. In other words, the silicon controlled rectifier 23 is again made conductive, thereby to short-circuit the shunt winding 16 and to reduce the generator output voltage sufficiently to prevent further charging of the battery 18. Thus, the action of the voltage cut-off circuit of the invention is to limit battery voltage to a predetermined level that keeps the battery close to full-charged condition and protects the battery from charging to too high a voltage that can damage the battery.

The voltage cut-off circuit of FIG. 1 is further designed to be substantially insensitive to wide variations of ambient temperature. For example, a chain saw may have to be used at both below freezing temperatures and in hot climates. In addition, of course, the generator 12 and the gasoline engine 10 may cause the circuit to heat up. On the other hand, Zener diodes such as 25, 26, silicon controlled rectifiers and diodes are all temperature sensitive. Therefore, preferably all of the solid state components such as 21, 23, 25 and 26 are disposed close to each other or are arranged in a common housing. This will insure that there is little temperature differential between these components. For example, the diodes 21 and the silicon controlled rectifier 23 operate at a decreasing voltage when the temperature increases. On the other hand, the Zener diodes can be selected to break down at an increasing voltage with increasing temperature or to break down at a decreasing voltage with increasing temperature. Thus, advantage can be taken of this situation to provide for an inherent temperature compensation, or a positive or negative temperature coefficient.

It should also be pointed out that the generator 12 is preferably so designed that it has inherently poor regulation. As a result, the current surge of the generator is low. This, in turn, makes it possible to utilize less costly components. For example, the silicon controlled rectifier 23 may be designed for a normal current of 1.6 amperes. Nevertheless it can handle a surge current for a short period up to 20 amperes.

The circuit of FIG. 1 shows two Zener diodes 25 and 26 in series. This permits a better temperature compensation. It is economically less expensive to provide a pair of Zener diodes which will break down at a predetermined voltage within 1%. This can be arranged by two complementary Zener diodes. This is less expensive than to provide a single Zener diode designed to break down at a certain voltage with a 1% variation.

Of course, on the other hand, one of the two Zener diodes, such as 26, may be omitted or more than two Zener diodes may be used. The circuit of FIG. 1 with only one Zener diode is characterized by its simplicity and by the few components required. If the Zener diode or diodes are correctly chosen for the proper breakdown voltage, no adjustment is needed, for example, of the resistor 27.

On the other hand, the disadvantage of a circuit with a single Zener diode is that it becomes more difficult to fully compensate for temperature variations. Also, as pointed out before, this requires a single Zener diode which must conduct at a set voltage within 1% and such units are more expensive.

While it will be understood that the circuit specifications of the voltage cut-off circuit of the invention illustrated in FIG. 1 may vary according to the design for any particular application, the following specifications are included, by way of example, only:

Battery 18 _____ 13.3 volts.
Silicon controlled rectifier 23 ____ Motorola type MCR 2304 or MCR 808.
Zener diodes 25 or 26 _____ IN958.
Rectifier 21 _____ Motorola type MR 322 (silicon rectifier) rated at 18 amps. at 15 volts DC.
Resistor 27 _____ 1200 ohms.

The circuit of FIG. 1 is arranged to cut off when the battery voltage has reached 15 volts. The two Zener diodes 25 and 26 are selected for a nominal Zener or breakdown voltage of 7.5 volts.

Further modifications of the voltage cut-off circuit of the present invention are illustrated in FIGS. 5 through 14. Thus, referring to FIG. 5 there is shown a voltage cut-off circuit which does not require any Zener diode. Instead a thermistor 40 is connected in series with the resistor 27, their junction point being connected to the control electrode 24 of the silicon controlled rectifier 23. This circuit otherwise operates in the same manner as does that of FIG. 1. Further description of the operation therefore is not needed. It should be noted that the diode 21 is now provided between the battery 18 and the series winding 15. The generator 12 has not been shown but only the generator output terminals 20.

Figure 5:
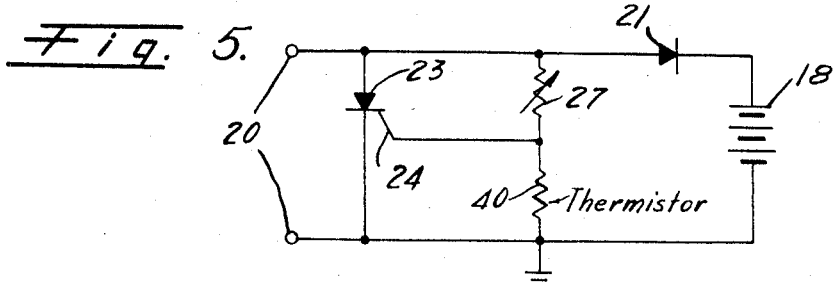

The advantage of the circuit of FIG. 5 is that it has a temperature compensating resistor, namely, the thermistor 40. This thermistor 40 can be chosen to match the temperature characteristic of the silicon controlled rectifier 23. The resistor 27 may be adjusted at room temperature for the proper trigger voltage.

On the other hand, the circuit of FIG. 5 has the disadvantage that it is difficult to obtain complete temperature compensation over a sufficiently wide temperature range by means of a thermistor to match all silicon controlled rectifiers. Hence, only a partial compensation is possible in practice. It will be realized that in a production run various silicon controlled rectifiers have varying properties and, hence, it is difficult to match the temperature characteristics of a production run of silicon controlled rectifiers with another production run of thermistors.

Thus, in the circuit of FIG. 5 the operating voltage must be present at a particular temperature and this may not be correct at other temperatures.

Figure 6:
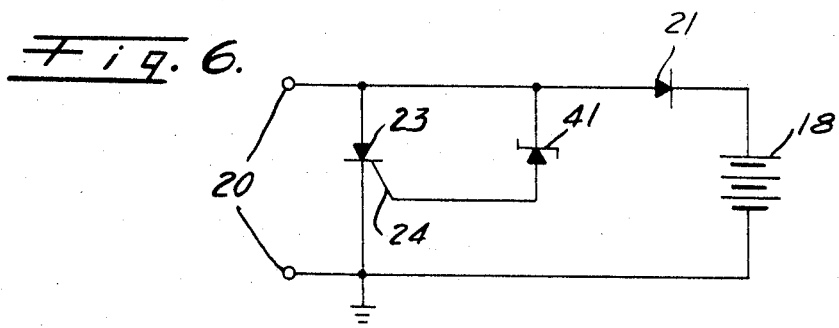

FIG. 6 illustrates another modification of the invention. In this circuit the resistor 27 has been omitted. Instead there is only a single Zener diode 41 connected between the diode 21 and the control electrode 24 of the silicon controlled rectifier 23. However, there is still a voltage divider consisting of the Zener diode 41 and that portion of rectifier 23 from control electrode 24 to ground.

This circuit can be compensated for changes of the ambient temperature. This ambient temperature may vary between a minimum of −20° F. (Fahrenheit) to a maximum of 150° F. The circuit is quite similar to that of FIG. 1, but it is even simpler because it requires no resistors.

The disadvantage is that the temperature characteristic of the control electrode of the silicon controlled rectifier 23 in turn varies with the temperature. Thus, this requires a precise selection of the Zener diode 41.

Figure 7:
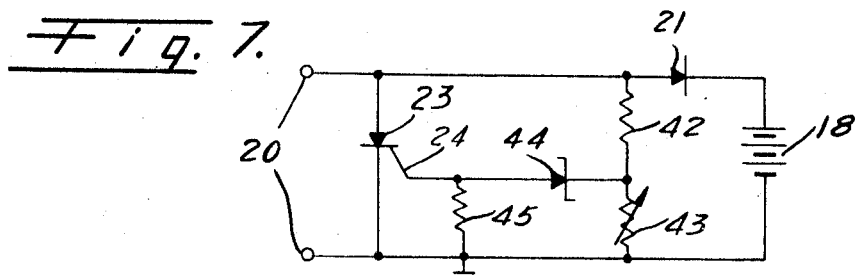

The circuit of FIG. 7 includes a voltage divider consisting of a fixed resistor 42 and a variable resistor 43 connected across battery 18 and diode 21. The junction point between resistors 42 and 43 is connected with the control electrode 24 of the silicon controlled rectifier 23 through a Zener diode 44. Furthermore, a resistor 45 connects the control electrode 24 to ground.

In the circuit of FIG. 7 it will be understood that the resistor 45 may be omitted. Discussing first the circuit without resistor 45, the advantage of this circuit is that it requires only a single Zener diode. The trigger circuit is very good. It should also be noted that due to the voltage divider 42, 43, the Zener diode 44 can be selected to respond to a low voltage and, hence, is readily chosen for a wide degree of temperature compensation.

The temperature coefficient is a direct function of the voltage and, hence, by cutting down the voltage which exists across the Zener diode, the temperature variations are also reduced. Hence, the temperatue compensation obtainable with the circuit of FIG. 7 is particularly good.

On the other hand, the disadvantage of the circuit is that below 5 volts, the Zener control curve is no longer sharp but becomes soft or rounded. On the other hand, at Zener voltages above 7 to 8 volts the Zener characteristic is particularly sharp. So in the present case a compromise or an optimum must be chosen.

Another advantage of the circuit of FIG. 7 is that the voltage divider or bleeder network 42, 43, can be chosen to handle several times more current than does the voltage divider of FIG. 1 consisting of one or more Zener diodes such as 25, 26, and a resistor 27. Due to the large bleeder current, temperature variations will have less influence on the voltage appearing at the Zener diode. The precision required for the Zener diode is not as large, but on the other hand, there are three semiconductor components with tolerances to be considered. However, it is possible to select resistor 43 or to adjust it to match the remainder of the circuit. In that case less accuracy is required for the Zener diode.

When the bleeder resistor 45 is added, the gate is less sensitive to changes of the current with the temperature. Of course, on the other hand, there are more components required.

Figure 8:
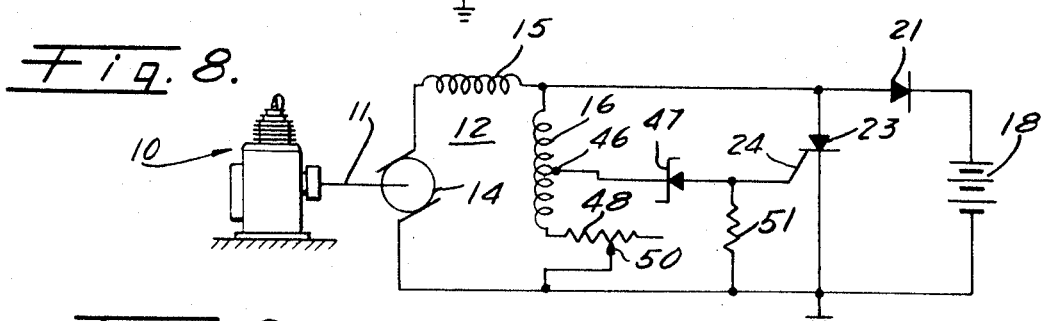

Turning now to FIG. 8, there is shown still another modification of the control circuit of the present invention. In the circuit of FIG. 8 the shunt field winding 16 is utilized as a voltage divider. Accordingly, a tap 46 is provided on the shunt winding 16 which is connected by means of a Zener diode 47 to the control electrode 24 of the silicon controlled rectifier 23. A resistor 48, having a variable tap 50, is connected between one terminal of the shunt winding 16 and ground. The main purpose of the variable resistor 48, 50 is to trim the tap 46 of the shunt winding 16. A resistor 51 is connected between the junction point of the Zener diode 47 and the control electrodes 24 and ground.

The circuit of FIG. 8 operates in a manner similar to that of FIG. 7. The resistor 51 and Zener diode 47 perform the function of the resistor 45 and the Zener diode 44 of the circuit of FIG. 7. Therefore, the circuit of FIG. 8 has essentially the same advantages and disadvantages as that of FIG. 7. Instead of varying the resistor 43 of the circuit of FIG. 7, the trimmer resistor 48 with its variable tap 50 is used to trim the resistance of the shunt field winding 16.

Figure 9:
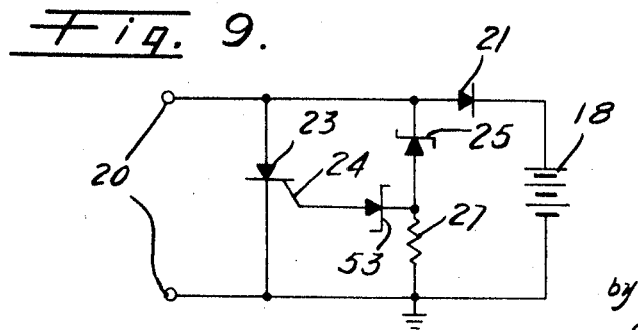

Also, the circuit of FIG. 9 is somewhat similar to that of FIG. 1 in that it uses two or more Zener diodes. In the circuit of FIG. 9 one Zener diode 25 is connected in series with the resistor 27 to form a voltage divider. However, in the circuit of FIG. 9 a second Zener diode 53 is connected between the junction of Zener diode 25 and resistor 27 on the one hand, and the control electrode 24 of the silicon controlled rectifier 23. However, the two Zener diodes 25 and 53 are still connected in series. By the proper selection of Zener diodes 25 and 53, and of the value of resistor 27, the circuit can be controlled even closer than that of FIG. 1. On the other hand, it has already been pointed out that the provision of two or more Zener diodes such as 25 and 53 is less expensive than a single Zener diode selected to trigger at a specified voltage within 1%, and can be selected for a wide range of temperature coefficients.

It has been found that particularly at high speed of the engine 10 the brushes of the D.C. generator 12 may bounce. This, of course, causes ripples in the output voltage which may cause the regulator circuit to recycle. To overcome this undesirable recycling of the voltage cutoff circuit a time delay or time constant circuit may be added. This has been illustrated in FIG. 10 to which reference is now made.

In the circuit of FIG. 10 an inductor 55 has been connected in series with the silicon controlled rectifier 23 across the input terminals 20. The voltage divider circuit includes a first Zener diode 25 connected in series with a second Zener diode 56 and a resistor 57. The junction point between the Zener diode 56 and the resistor 57 is connected to the gate electrode 24 of the controlled rectifier 23.

Furthermore, a capacitor 58 may be connected between the junction point of the two Zener diodes 25 and 56 on the one hand and one of the terminals 20 on the other hand.

The inductor 55 has the purpose to apply at least a portion of the back electromotive force of the shunt field winding 16 to the silicon controlled rectifier 23. To this end a separate inductor such as 55 may be used as shown in the circuit of FIG. 10. It is also feasible to use a portion of the inductance of the shunt field winding 16 as will be subsequently explained in connection with the circuit of FIG. 11.

The circuit of FIG. 10 may also be considered to be a modification of the circuits of FIGS. 6 or 7. The capacitor 58 operates in conjunction with the remainder of the circuit as a filter or smoothing circuit. The voltage peaks which may appear due to the skipping of the brush of the generator are filtered out above a predetermined voltage which is the breakdown voltage of the Zener diode 25. The excess voltage is absorbed by the capacitor 58.

Thus, the capacitor 58 discharges when the Zener diode 56 breaks down. This discharge takes place through the remainder of the trigger circuit, that is, through the Zener diode 56 and resistor 57 in parallel with the control or gate-cathode junction of silicon controlled rectifier 23. On the other hand, the capacitor 58 is charged when the break-down voltage of Zener diode 25 is exceeded so that the Zener diode conducts current. When the capacitor 58 discharges a voltage pulse is delivered to the gate electrode 24 of the silicon controlled rectifier 23 which positively insures conduction of the controlled rectifier.

It will be understood that the capacitor 58 may be omitted from the circuit of FIG. 10. In that case the inductor 55 can still be used to provide an inductance-resistance circuit represented by the inductance of inductor 55 and the resistance of controlled rectifier 23 and the remainder of the circuit as seen looking into the rectifier 23, to provide a time constant or smoothing circuit.

The circuit of FIG. 11 is similar to that of FIG. 10 but does not require a separate inductor 55. Thus, as shown in FIG. 11, the shunt field winding 16 is provided with an intermediate tap 60 which is connected to one terminal of the silicon controlled rectifier 23. Thus, a portion of the inductance of the shunt winding 16 is in series with the controlled rectifier 23 to apply a portion of the back electromotive force of the field winding to the controlled rectifier. The remainder of the circuit of FIG. 11 is the same of that of FIG. 10 and its operation does not require further explanation.

The circuit of FIG. 12 to which reference is now made, is similar to that of FIG. 10 but does not include the inductor 55, nor is the silicon controlled rectifier 23 connected in series with a portion of the field winding 16 as shown in FIG. 11. However, the circuit of FIG. 12 does include the capacitor 58, the function and purpose of which has been previously described.

The circuit of FIG. 13 is somewhat similar to that of FIG. 7. However, the resistor 42 of the circuit of FIG. 7 has been replaced by a Zener diode 61. Thus, a voltage divider consisting of the Zener diode 61 and the adjustable resistor 43 is connected across rectifier 21 and battery 18. The junction point between Zener diode 61 and resistor 43 is connected through a second Zener diode 44 to the gate electrode 24 of the controlled rectifier 23. It should also be noted that the resistor 45 shown in the circuit of FIG. 7 has also been omitted. The circuit of FIG. 13 provides temperature compensation because the resistor 43 is adjustable for changing the slope of the Zener diode voltage-current characteristic curve.

Referring now to FIG. 14, the voltage divider shown here which consists of the Zener diode 25 in series with the resistor 27 is directly connected across the battery 18. Hence, the rectifier 21 is connected in between the Zener diode 25 and one of the terminals 20. The junction point between Zener diode 25 and resistor 27 is connected through a second Zener diode 53 and a resistor 63 to the gate electrode 24 of the controlled rectifier 23.

The purpose of the resistor 27 is to limit the current which can flow through the voltage divider, that is, through the Zener diode 25. The second resistor 63 again serves the purpose to limit the current which can flow through the second Zener diode 53 and the gate electrode 24. The circuit of FIG. 14 has the advantage of providing better temperature compensation. Thus, the diode 21 is not included in the voltage cut-off circuit. This makes it easier to provide either a positive or a negative temperature coefficient with a rising Zener voltage. This, of course, can be achieved by the proper selection of the two Zener diodes 25 and 53.

There has thus been disclosed a voltage cut-off circuit for controlling the charging current by the voltage across a set of secondary cells forming a battery. The electronic circuit of the present invention is particularly adapted for controlling the recharging of a secondary battery by a DC generator which, in turn, is driven by a gasoline motor having a speed that varies within wide limits. The circuit of the present invention makes it possible to recharge a secondary battery within an extremely short time without damaging the battery. Instead of controlling the charging current throughout the battery, what is controlled is the charging voltage developed by the generator. This, of course, depends on the battery voltage which is at least an approximate indication of the state of charge of the battery. Various modifications of the voltage cut-off circuit of the present invention have been disclosed. All of these circuits are designed to minimize the effects of temperature variations on the solid state components which may include a rectifier, a silicon controlled rectifier and one or more Zener diodes.

The invention and its attendant advantages will be understood from the foregoing description and it will be apparent that various changes may be made in the form, construction and arrangement of the parts of the invention without departing from the spirit and scope thereof or sacrificing its material advantages, the arrangement hereinbefore described merely by way of example and we do not wish to be restricted to the specific form shown or uses mentioned except as defined in the accompanying claims, wherein various portions have been separated for clarity of reading and not for emphasis.

We claim:

1. A voltage-responsive circuit for cutting off the charging current between a direct-current generator having a shunt field winding, and a battery including at least one secondary cell connected across the output terminals of said generator through a rectifier poled to permit charging the battery when the voltage across the generator exceeds the battery voltage, said circuit comprising a normally open switch connected across said shunt winding of said generator and adapted when triggered to short-circuit said shunt winding, and circuit means coupled to said switch and responsive to the voltage across said battery for closing said switch in response to a predetermined voltage across said battery being reached thereby to short-circuit said shunt winding.

2. A voltage-responsive circuit in accordance with claim 1 wherein said switch is a controlled rectifier having a control electrode and said circuit means is a voltage divider having an intermediate point, said intermediate point being connected to said control electrode.

3. A circuit as defined in claim 2 wherein said voltage divider includes at least one Zener diode and a resistor, said intermediate point being the junction between said Zener diode and said resistor.

4. A circuit as defined in claim 2 wherein said voltage divider consists of two Zener diodes and a resistor connected in series, and said intermediate point is the junction between said resistor and one of said Zener diodes.

5. A circuit as defined in claim 2 wherein said voltage divider consists of two resistors, one of which is adjustable.

6. A circuit as defined in claim 5 wherein a Zener diode is connected between the junction point of said resistors and said control electrode.

7. A circuit as defined in claim 5 wherein a Zener diode is connected between the junction point of said resistors and said control electrode, and wherein a further resistor is connected between said control electrode and one terminal of said shunt winding.

8. A circuit as defined in claim 2 wherein said voltage divider includes said shunt winding and a variable resistor connected in series, a Zener diode being connected between an intermediate point on said shunt winding and said control electrode, and a resistor connected between said control electrode and one terminal of said battery.

9. A circuit as defined in claim 2 wherein said voltage divider consists of a first Zener diode and a resistor connected in series, and a second Zener diode connected between the junction of said first Zener diode and said resistor on the one hand and said control electrode on the other hand.

10. A circuit as defined in claim 2 wherein said voltage divider is connected directly across said battery and consists of a first Zener diode and a first resistor connected in series, a second Zener diode and a second resistor being connected in series between the junction point of said first Zener diode and said first resistor on the one hand, and said control electrode on the other hand.

11. A voltage-responsive circuit in accordance with claim 1 wherein said switch is a controlled rectifier having a control electrode, and said circuit means is a Zener diode connected between one output terminal of said generator and said control electrode.

12. A voltage-responsive circuit for cutting off the charging current from a direct-current generator having a shunt field winding to a battery having at least one secondary cell connected across the output terminals of said generator, said circuit comprising a means for monitoring the voltage across said battery, and switch means responsive to said monitoring means for short-circuiting said shunt winding, said switch means being connected across said shunt field winding.

References Cited

UNITED STATES PATENTS

| | | | |
|---|---|---|---|
| 3,009,091 | 6/1958 | Hallidy | 322—73 X |
| 3,217,229 | 11/1965 | Ballard | 320—68 |
| 3,260,917 | 7/1966 | Shimwell et al. | 320—39 X |

OTHER REFERENCES

Silicon Zener Diode and Rectifier Handbook, 2nd ed., 1961, Motorola, p. 117 relied upon.

JOHN F. COUCH, Primary Examiner.

STANLEY WEINBERG, Assistant Examiner.

U.S. Cl. X.R.

320—40, 64; 322—68